R. L. CRANE 2,932,229

BAND TYPE CUTOFF SAW

Filed April 7, 1958

Inventor
Robert L. Crane
By
Attorney

United States Patent Office 2,932,229
Patented Apr. 12, 1960

2,932,229

BAND TYPE CUTOFF SAW

Robert L. Crane, Hopkins, Minn., assignor to Continental Machines, Inc., Savage, Minn., a corporation of Minnesota Application April 7, 1958, Serial No. 726,872

6 Claims. (Cl. 83—201)

This invention relates generally to band saws and is a continuation-in-part of my copending application, Serial No. 533,786 filed September 12, 1955 now Patent No. 2,883,736 issued April 28, 1959. More particularly, this invention refers to band saws of the type used in cutting lengths of metal bars and the like into smaller pieces for use as required.

Band saws of this nature usually comprise a saw head assembly consisting of an endless saw band trained about a pair of pulleys or wheels mounted in the opposite end portions of an elongated housing for rotation on spaced parallel axes. One of the wheels about which the band is trained is power driven and drives the saw band through frictional engagement therewith.

In most cases the saw head assembly is supported for motion toward and from a fixed work zone in which stock to be cut is held while the cutting stretch of the saw band acts thereon.

It is an object of this invention to provide a band type cutoff saw of the character described incorporating improved means for supporting the saw head assembly for translatory motion toward and from a fixed working zone at which cutting takes place.

More specifically, it is an object of the invention to provide a band type cutoff saw wherein the saw head assembly is rigidly supported upon a single elongated guide member and is constrained to translatory motion along the length of the guide member toward and from a fixed working zone.

Another object of this invention resides in the provision of improved means for holding stock while it is being cut by the saw and for feeding such stock into the working zone.

In this respect it is a further object of the invention to provide stock holding and feeding means which comprises a stock holding vise which operates in a fixed location adjacent to the cutting zone, and a work feeding vise mounted for bodily motion in opposite directions toward and from the stock holding vise along a path normal to the plane of the cutting stretch of the saw band, so that stock gripped by said work feeding vise will be fed into the working zone as a consequence of bodily motion of said movable vise toward the stock-holding vise.

It is also a purpose of this invention to provide a band type cutoff saw of the character described, the components of which are exceptionally well adapted for automatic operation; and it is a further object of this invention to provide control instrumentalities for automatically feeding stock to be sawed, for governing the operation of the vises, and for controlling the movement of the saw head assembly.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof and in which.

Referring now more particularly to the accompanying drawings in which like reference characters designate like parts throughout the several views, the numeral 10 generally designates an elongated main base having a horizontal substantially trough-like top 11, and a post P rigidly anchored in one end portion of the base and projecting vertically a distance thereabove. The post P constitutes a single upright supporting and guiding member for the saw head assembly H, the latter being mounted thereon in cantilever fashion to lengthwise overlie the base 10.

As will be discussed hereinafter, the saw head assembly includes an endless saw band 13 having its cutting stretch 14 constrained to travel in a horizontal path and held by guides 15 with the flat sides of the blade disposed in parallel vertical planes. The saw band has teeth 16 on one edge thereof, and the teeth on the cutting stretch 14 of the band face downwardly toward the base 10.

The saw head assembly is supported by the post P for up and down translatory motion, with downward motion of the assembly carrying the cutting stretch 14 of the saw band into cutting engagement with stock or work W held in a fixed position in a sawing zone directly beneath the cutting stretch of the band, between the band and the surface S of a work supporting table 18 mounted on the top of the base 10.

Stock or work W to be cut into pieces generally comprises elongated bars or shafts occupying a position lengthwise normal to the plane of the cutting stretch of the saw band as the latter cuts through the stock. The front end portion of the stock which rests upon the surface S of the table 18 is stationarily held in a front vise 20 mounted on the table at a fixed location adjacent to the sawing zone and immediately behind the plane of the cutting stretch of the saw band. The rear portions of the stock thus held in the vise may be supported in a more or less conventional manner by a series of transverse rollers 22 mounted upon an elongated rear base 23, preferably fixed to the front base 10 and projecting rearwardly from substantially the medial zone thereof.

The base 23 also supports a rear vise 24 mounted for bodily motion forwardly and rearwardly with respect to the front vise so that when the latter is released, work or stock gripped in the rear vise can be fed forwardly across the plane of the cutting stretch of the saw band and into the sawing zone to the proper position for the next cutting off operation.

The saw head assembly H follows more or less conventional construction in so far as it comprises an elongated housing 26 having the endless saw band 13 trained over a pair of wheels or pulleys 27 and 28 rotatably mounted in opposite end portions of the housing. In the present case, each of the wheels is mounted on a shaft 29 supported in bearings (not shown) carried by the housing and which constrain the wheels to rotate on parallel axes which lie in a horizontal plane normal to the post P which supports the saw head assembly. As is customary, one of the wheels 27 comprises an idler pulley for the saw band, and the other wheel 28 comprises a drive pulley for the band.

Rotation may be imparted to the drive pulley as by means of an electric motor 31 mounted on an extension 32 at the post end of the housing 26, and drivingly connected with the pulley 28 through a speed changing device 33 and a gear reducer 34, the latter having a drive pinion 35 meshing with an internal ring gear 36 on the drive pulley 28 and formed as a part thereof. For a further description of the drive pulley 28, reference may be had to my copending application Serial No. 643,600, filed March 4, 1957, as a division of my aforesaid copending application Serial No. 533,786.

In order to afford exceptionally good rigidity in the mounting of the cutting head assembly upon the post P, it is a feature of this invention that the post, though of hollow construction, is substantially hexagonal in cross section. Two opposite parallel sides 38 of the post which are disposed in planes parallel to the long dimension of the base 10 are elongated, however, and the included angle between adjacent pairs of shorter sides 39 is decreased to substantially 90°. Consequently the apex edges of the right angle sides 39 lie in a common plane parallel to the elongated sides 38 of the hexagon and to the long dimension of the base 10.

The vertical post P is loosely received in correspondingly shaped holes in the horizontal top and bottom walls 41 and 42 of the housing of the saw head assembly, so that the latter is free to move up and down on the post. Such up and down bodily motion of the saw head assembly is very accurately guided by sets of angularly disposed rollers 43 carried by the top and bottom walls of the housing and having their peripheries intimately engaging the exterior surfaces of the shorter sides 39 of the post P. The rollers 43, of course, not only prevent sagging of the saw head assembly but positively preclude even the slightest rotational movement of the saw head assembly about the vertical axis of its supporting post.

Attention is directed to the fact that the flat upright sides 45 of the housing are disposed in parallel relationship to the elongated sides 38 of the post, and that the saw head assembly is mounted cantilever fashion on the post with both of its wheels 27 and 28 entirely to one side of the post and with the orbit of the saw band substantially in the plane containing the apex edges of the shorter sides 39 of the post. The plane containing the axes of the wheels 27 and 28 is also disposed horizontally and normal to the axis of the post.

Any suitable means may be employed for elevating and lowering the saw head assembly on the post P but, in the present case, up and down translatory motion of the saw head assembly is governed by a pair of hydraulic cylinders 47 mounted on the opposite long sides 38 of the post and having their rams 48 projecting upwardly and secured as at 49 to the top wall 41 of the saw housing. The cylinders 47 may be of the single acting type and when fluid under pressure is supplied to their lower ends, their rams are propelled upwardly to lift the entire saw head assembly and thus carry the cutting stretch 14 of the saw band away from the cutting zone. Downward feeding of the saw into and through the stock being cut may be readily accomplished by controlling the exhaust of pressure fluid from the cylinders 47, as by an adjustable bleed orifice in a manner to be described later.

Again referring to the vise structures 20 and 24, it will be recalled that the front vise 20 is mounted in a fixed position on the work table 18 and located directly adjacent to the sawing zone, immediately behind the plane of the cutting stretch 14 of the saw band. The rear vise 24 is identical to the front vise 20 except that it is mounted on a carriage 75 supported on the rear base 23 for bodily back and forth motion along a fixed path toward and from the front vise. The upper surface of the carriage 75 lies in the plane of the work supporting surface S on the table 18, and both the work table and the carriage 75 are provided with lateral extensions 18' and 75' projecting in a direction away from the post P.

Inasmuch as the front and rear vises are identical, the following description of the rear vise 24 applies to both. The rear vise comprises a stationary jaw 77 mounted on the upper face of the carriage 75 and facing away from the post P, and it is always in alignment with the stationary jaw of the front vise. Opposite to and cooperating with the stationary jaw 77 is a movable jaw 78, also mounted on the upper surface of the carriage. The movable jaw 78 is constrained to reciprocatory motion toward and from the stationary jaw along a path parallel to the plane of the cutting stretch 14 of the saw band. For this purpose, the jaw 78 may have a narrow keel 79 fixed to the underside thereof and slidingly received in an elongated upwardly opening slot 80 in the carriage. The slot 80 also opens downwardly into a wider slot 81 in the underside of the carriage. A retaining plate 82 in the wider slot and secured to the underside of the keel 79 thus cooperates with the latter to constrain the jaw to bodily reciprocatory motion toward and from the stationary jaw 77.

While the movable jaw 78 may be manually moved toward the stationary jaw 77 to effect gripping of stock to be cut therebetween, a single acting hydraulic cylinder 83 is preferably provided to effect such clamping motion of the movable jaw. The cylinder is mounted on the outer end of the carriage extension 75' and the motion of its plunger 84, during extension of the plunger, is translated into clamping motion of the movable jaw 78 (toward the stationary jaw) through a quick release mechanism 85.

This quick release mechanism comprises an elongated bar 86 horizontally disposed on the carriage extension and constrained to reciprocatory motion toward and from the stationary jaw by any suitable means. The plunger 84 bears directly upon the outer end of this bar.

Endwise sliding motion of the bar 86 produced by extension of the plunger of cylinder 83 is translated into clamping motion of the movable jaw 78 of the vise through a pawl 88 having one end engaged with ratchet teeth on the upper face of the bar and its other end pivotally connected as at 89 to a part on the base of the jaw 78. This ratchet connection enables the movable jaw 78 to be quickly manually moved to a position close to or lightly engaging stock between the jaws, and at which position final clamping motion may be imparted to the movable jaw by a relatively small extension of the plunger 84 of the hydraulic cylinder. However, when the outer end of the pawl is swung upwardly from engagement with the ratchet teeth, the movable jaw 78 is free to be moved manually away from the stationary jaw to thus facilitate loading of stock to be cut into the vise.

It will be noted that hydraulic actuation of the ratchet bar 86 is yieldingly resisted by a compression spring 91 confined between opposing abutments on the bar and the carriage 75. The spring, therefore, serves to effect retraction of the bar and the plunger 84 when pressure fluid in the cylinder is released by a suitable control valve to be described hereinafter.

Figure 6:
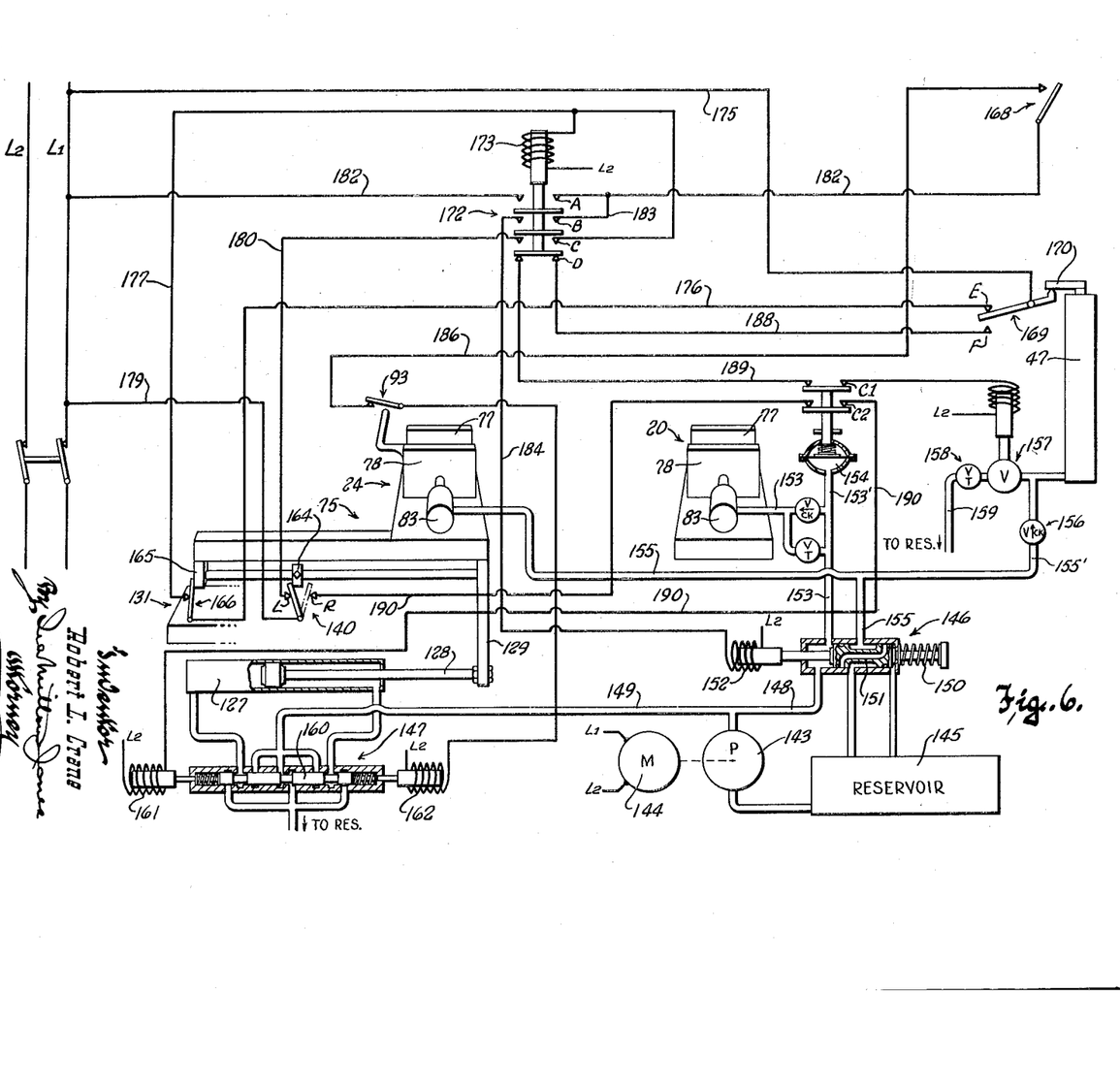
Figure 6 is a combined electrical and hydraulic diagram of one type of control system by which automatic operation of the saw may be effected.
Figure 7:
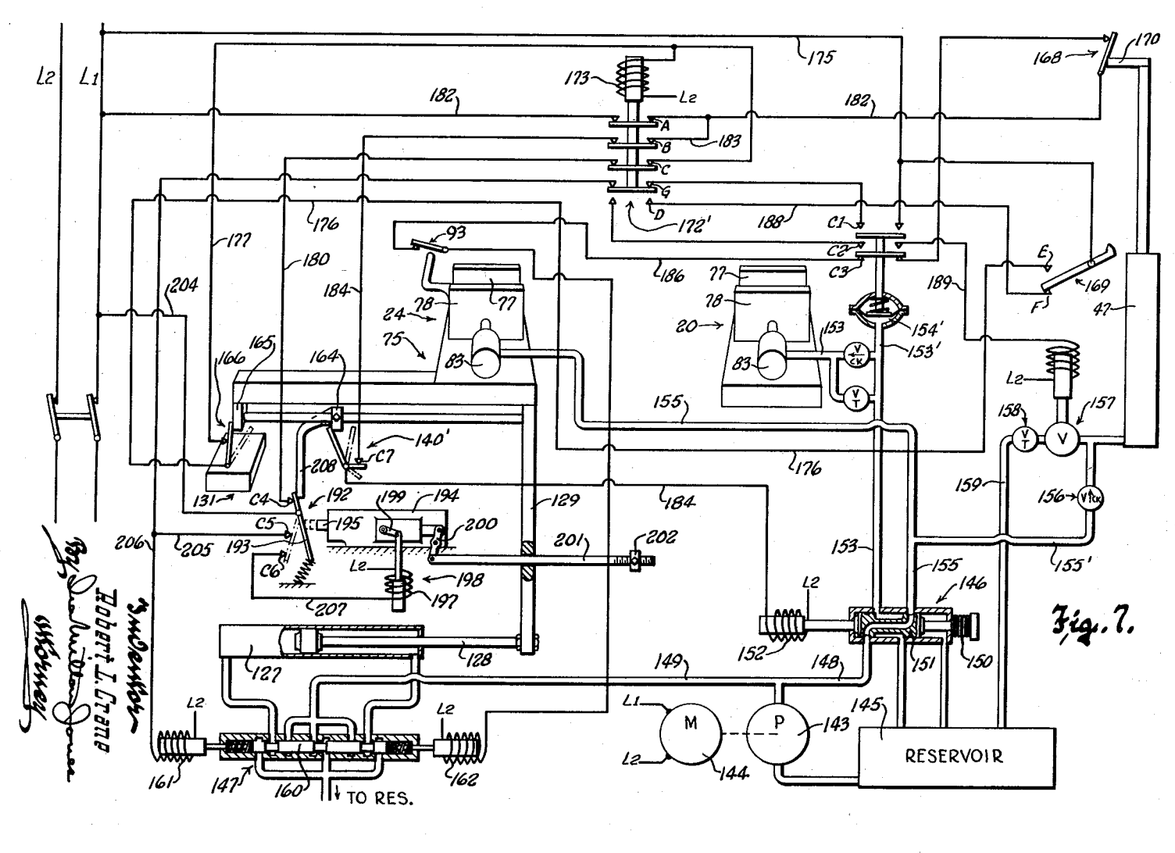
Figure 7 is a diagram showing a modified control system.

Automatic controls such as shown in Figures 6 and 7 are provided to periodically effect the back and forth motion of the carriage 75 necessary to feed predetermined lengths of stock into the working zone by the rear vise 24, and it is necessary to stop such feeding motion of the carriage when the stock being cut is used up. This function can be performed by a limit switch 93 mounted on the carriage 75 to be actuated by an adjustable stop 94 on the ratchet bar 86 as a consequence of the abnormal amount of hydraulically produced travel of the bar resulting from closure of the jaws of the rear vise when there is no stock in position to be gripped thereby.

In most instances the cooperating stationary and movable jaws 77 and 78 are all that are required to satisfactorily hold the stock or work during feeding of the work by the rear vise or holding of the work by the front vise. There are times, however, as when a group of bars or shafts are to be cut simultaneously that an upper jaw 96 for each vise may be used to advantage in conjunction with the jaws 77 and 78 to hold the stock firmly in place on the work supporting surfaces. The upper jaw 96, of course, must not interfere with the gripping of the stock by the stationary and movable jaws 77 and 78, and for this purpose it is suspended for up and down motion from a crosspiece or bridge 97 which spans the space between the stationary and movable jaws and is supported on their upper ends.

The bridge 97 has a medial portion 98 provided with a central vertical bore 99 therein, and its opposite end portions are bifurcated to provide spaced arms 100. The arms rest on the upper ends of the jaws 77 and 78 and loosely embrace screws 101 which are threaded downwardly into the upper ends of the jaws. The bifurcated ends of the bridge permit whatever relative motion is necessary between the jaws 77 and 78 to clampingly engage them with stock to be cut, and also provide for centering of the upper jaw with respect to the stock held between the jaws 77 and 78. The screw 101 of the stationary jaw may be tightened to clamp the adjacent end of the bridge thereto, while lock nuts 102 on the other screw may be adjusted to snugly but slidably hold the opposite end of the bridge in engagement with the top of the movable jaw. Thus, the bridge does not interfere with clamping and/or releasing motion of the movable jaw 78.

While the upper jaw 96 may be forced downwardly into clamping engagement with stock in the bite of the jaws 77 and 78 by conventional mechanical means, it is hydraulically operated in the present case by the plunger 104 of a single acting hydraulic cylinder 105. The cylinder comprises a short length of tubing endwise confined between the upper face of the medial portion 98 of the bridge 97 and an end cap 106 thereabove connected to the bridge by screws 107. The plunger 104 is also tubular and projects downwardly through the bore 99 in which it is slidingly received to have a nut 108 rotatably mounted on its lower end. The nut, however, is restrained against axial motion relative to the plunger.

A plunger return spring 109 in the cylinder and surrounding the plunger biases the same upwardly to a retracted position defined by its engagement with the underside of the end cap 106.

The upper jaw 96 occupies a position beneath the nut 108, and is mounted on the lower end of a post 110 which is threaded in the nut but slides freely up and down in the hollow interior of the plunger. Thus whenever fluid under pressure is introduced into the upper end of the cylinder, the plunger is forced downwardly thereby against the bias of its return spring 109 to carry the post and the jaw 96 downwardly with it into clamping engagement with stock embraced by the jaws 77 and 78.

It should be observed that only a short stroke of the piston 104 is necessary to effect proper clamping engagement between the upper jaw 96 and the stock, for the upper jaw is quickly adjustable to any position close to the stock to be clamped in the vise by manual rotation of the nut 108 on the lower end of the plunger.

Up and down motion of the upper jaw 96 is guided by the jaws 77 and 78 to assure against rotational movement of the upper jaw about the axis of the post 110 upon which it is mounted. For this purpose, the upper jaw has opposite bifurcated end portions, the bifurcations 112 of which slidingly embrace the narrower upper portions of the jaws 77 and 78 and are accommodated in substantially deep upwardly opening clearance notches 113 in the wider lower portions of the upright jaws.

In the event the upper jaw 96 is not needed and stock can be properly held in position upon the work supporting surfaces of the table 18 and the carriage 75, the entire upper jaw assembly can be quickly removed merely by detachment of the screws 101 from the upper ends of the jaws 77 and 78.

Figure 1:
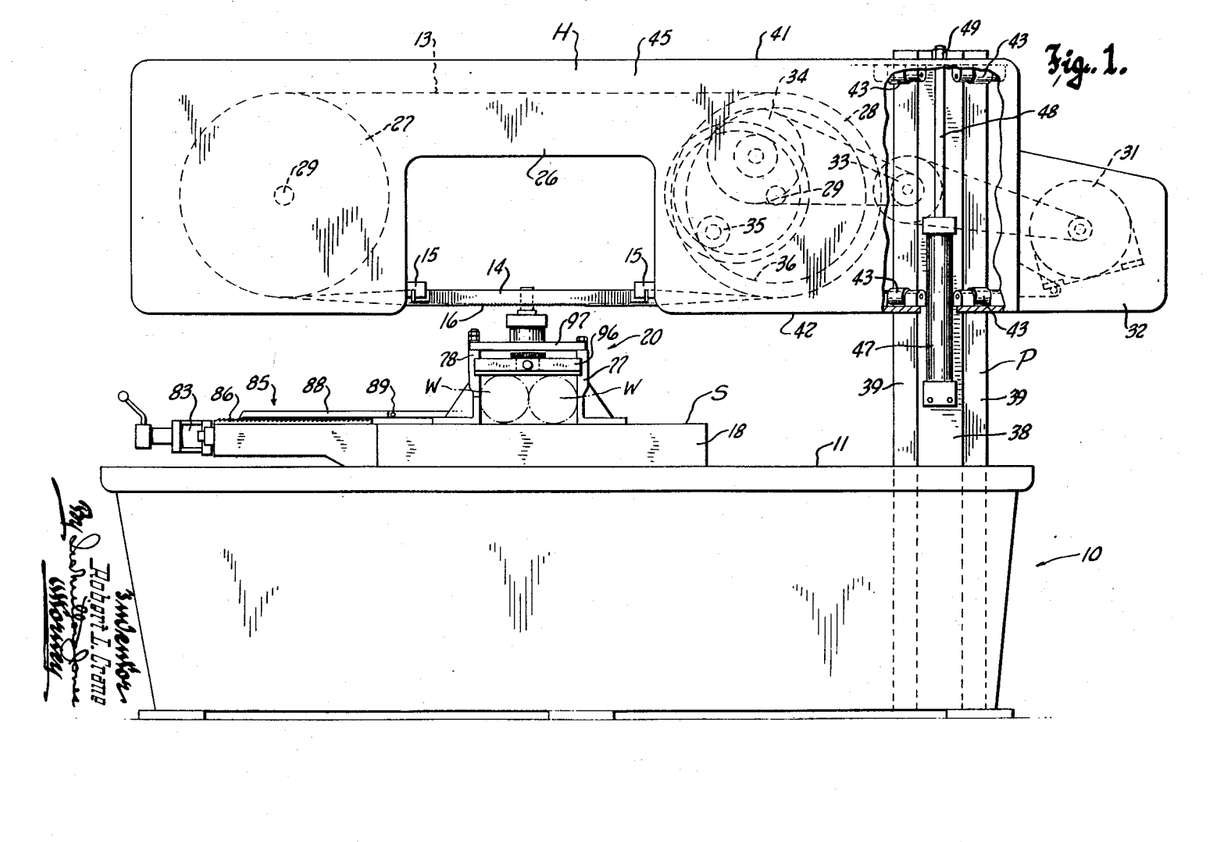
Figure 1 is a front elevational view of a band type cutoff saw embodying the principles of this invention and having parts thereof broken away to illustrate details of construction.
Figure 2:
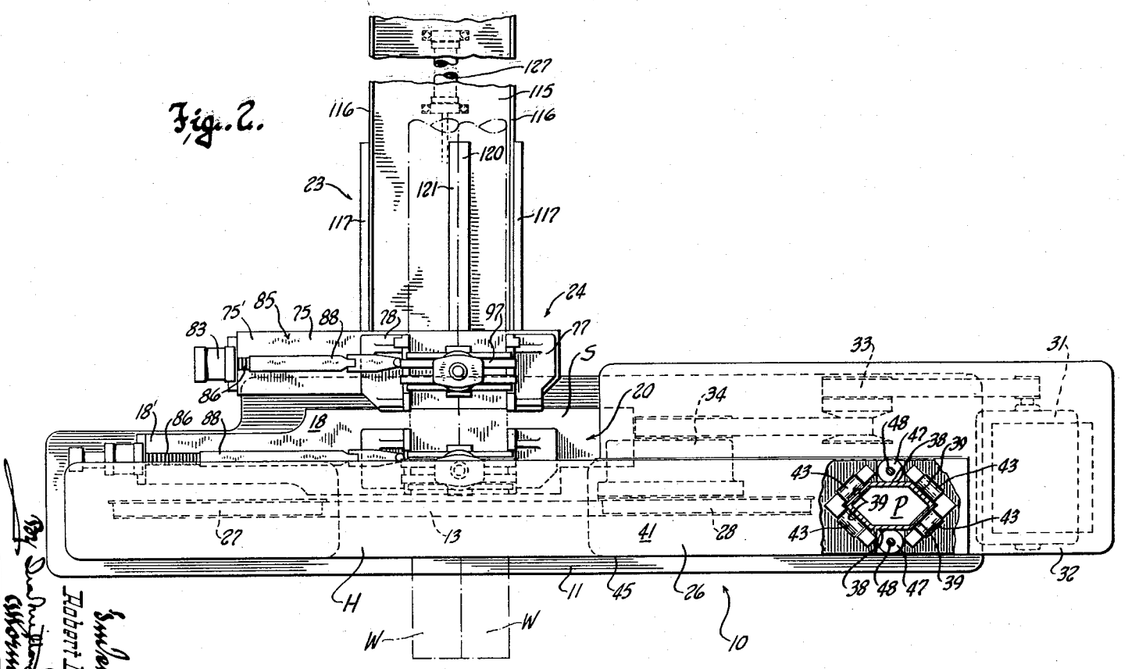
Figure 2 is a plan view of the saw shown in Figure 1 and likewise having parts thereof broken away to show details of construction.
Figure 3:
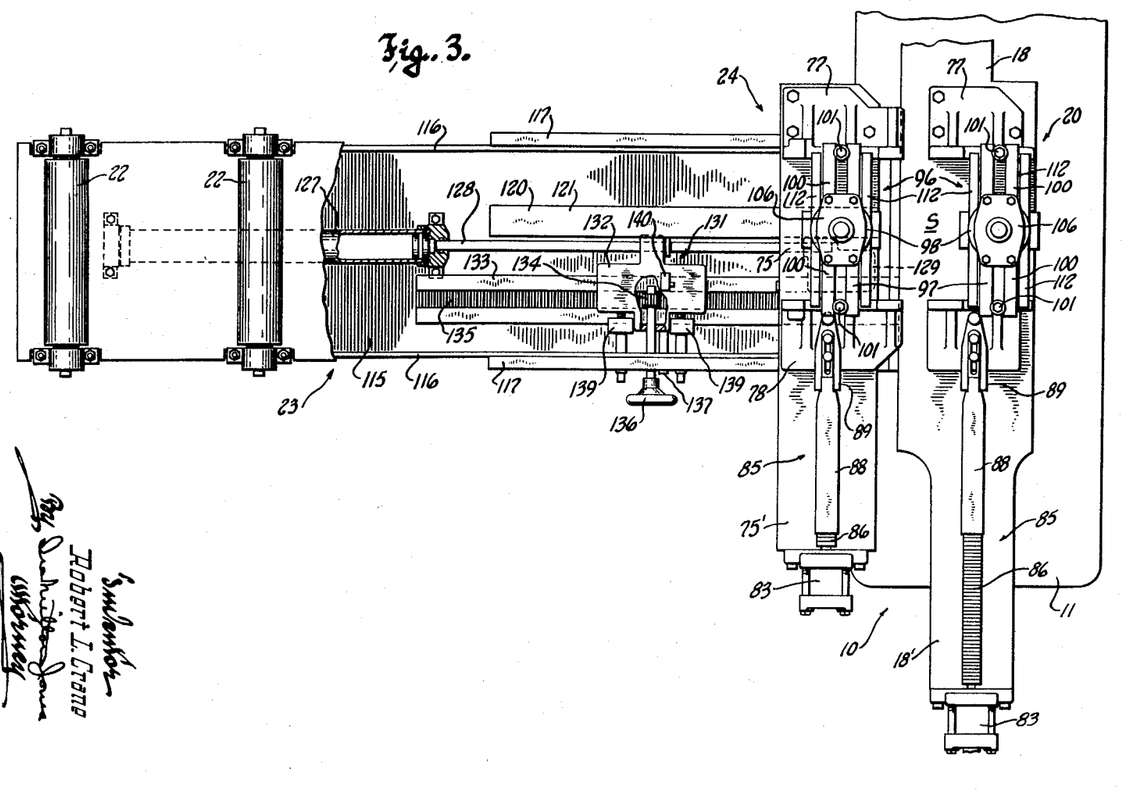
Figure 3 is an enlarged plan view of the stock holding and advancing means, parts thereof being broken away and shown in section.
Figure 4:
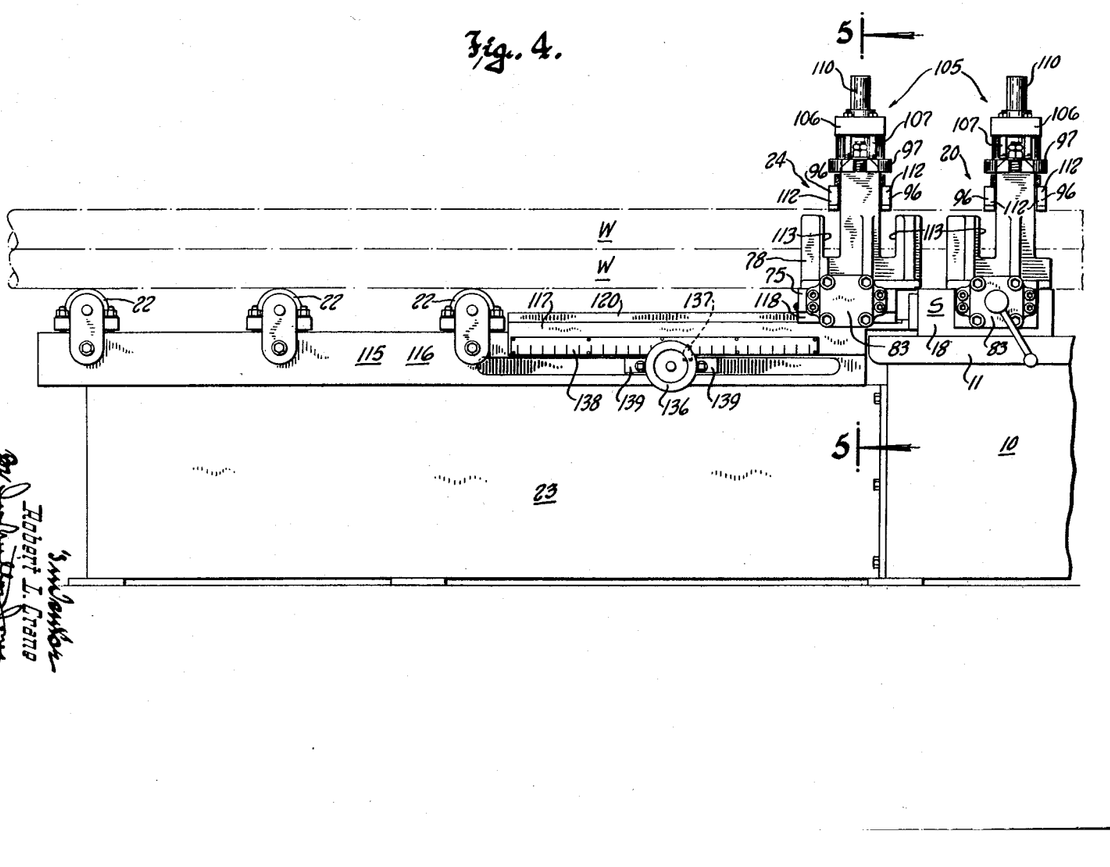
Figure 4 is an elevational view of the stock holding and advancing means shown in Figure 3.
Figure 5:
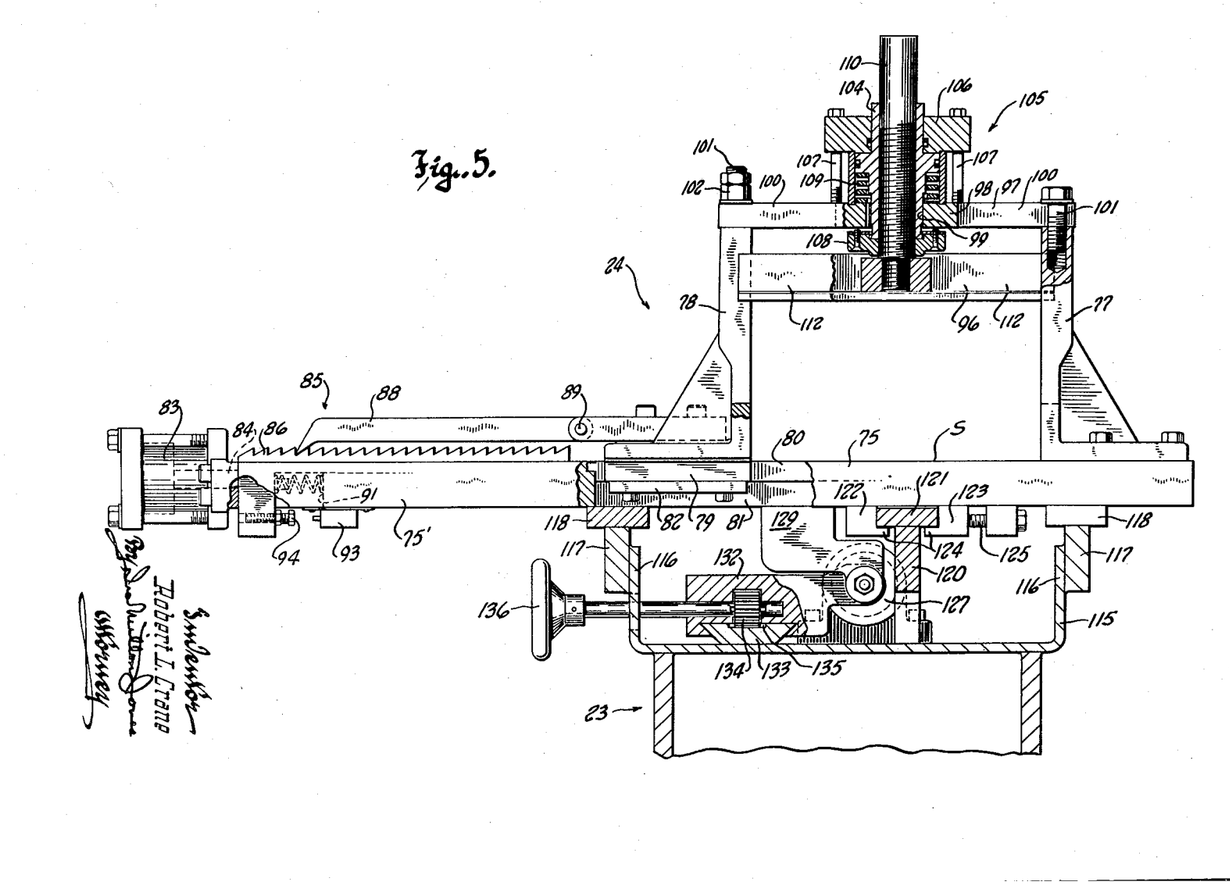
Figure 5 is a sectional view taken along the line 5—5 of Figure 4.

As stated previously, the carriage 75 upon which the rear vise 24 is mounted, is supported by the rear base 23 by means which constrains the carriage to horizontal translatory motion toward and from the front vise 20. Referring to Figures 3 and 5 particularly, it will be observed that the top of the rear base has a channel 115 fixed thereto with the flanges 116 of the channel projecting upwardly and extending lengthwise of the rear base. Each flange has a horizontal rail 117 fixed to its upper end portion, and slide bars 118 attached to the underside of the carriage rest on these rails to slidingly support the carriage on the base with the carriage spaced above the web of the channel.

Intermediate the flanges 116 the channel also has a guide rail 120 fixed thereto and projecting upwardly toward the underside of the carriage. The guide rail is substantially T shaped in cross section and has its head 121 closely underlying the carriage and extending horizontally lengthwise of the rear base so as to be disposed substantially normal to the plane of the cutting stretch 14 of the saw band. Guide blocks 122 and 123 mounted on the carriage at its underside slidingly embrace the opposite longitudinal edges of the head 121 on the guide rail, and these blocks are provided with opposing ledges 124 engaging under the head 121 to hold the carriage on the rails 117 and to constrain the carriage to translatory motion toward and from the front vise 20. One of the guide blocks 122 is preferably fixed on the carriage, while the other block 123 is adjustable toward and from the adjacent side edge of the head 121, as by means of an adjustment screw 125 on the carriage.

Back and forth motion is imparted to the carriage 75 by means of a long stroke double acting hydraulic cylinder 127 mounted on the rear base between and parallel to the flanges 116 of the base channel. The plunger 128 of the cylinder projects forwardly beneath the carriage, directly alongside the guide rail thereof, and has its extremity anchored in a bracket 129 on the underside of the carriage.

The extent of forward travel of the carriage may be determined by the plunger of cylinder 127 when the plunger is fully extended and at its forward limit of travel. Rearward motion of the carriage, of course, may also be limited by the magnitude of the retraction stroke of the plunger 128.

It is a feature of this invention, however, that rearward motion of the carriage and the vise thereon may be halted at any point between the limits of back and forth motion of the carriage. For this purpose an adjustable stop mechanism 131 is provided, located generally behind the carriage 75 and nested in the channel 115 between the plunger 128 of the cylinder and the adjacent flange of the channel.

The adjustable stop mechanism comprises a slide 132 mounted on an elongated way 133 and constrained thereby to back and forth motion in a path parallel to the path of motion of the carriage. For ease of back and forth adjustment, the slide rotatably carries a pinion 134 which meshes with rack teeth 135 on the upper face of the way, and a readily accessible hand wheel 136 on the pinion shaft enables the slide to be moved to any desired position along the length of the way.

A pointer 137 on the slide also cooperates with a scale 138 fixed on the adjacent channel flange to indicate the exact position of the slide and the point at which rearward motion of the carriage 75 is to be arrested. Wedge blocks 139 on the slide may be tightened upon the way 133 after the slide has been adjusted so as to securely lock the slide in its adjusted position.

If desired, a mechanical stop may be fixed on the slide for engagement by the carriage during rearward translation thereof by its hydraulic cylinder to thus limit the rearward travel of the carriage 75 and the vise thereon. In the present case, however, the stop carried by the slide 132 comprises a limit switch 140 positioned to be engaged and actuated by a part on the carriage during rearward travel thereof. When thus actuated, the retraction stroke of the plunger 128 is halted by the limit switch acting through control instrumentalities, now about to be described, which also automatically govern extension of the plunger after it has been stopped in this manner.

As shown in Figure 6, these control instrumentalities are part of a control system which automatically governs the entire operation of the apparatus, including raising and lowering of the saw head assembly by its hydraulic cylinders 47 (only one being shown in the diagram), clamping and releasing of work or stock in the vises by their cylinders 83 and 105, and hydraulically produced forward and rearward travel of the carriage 75. Moreover, the control system functions to operate the various components of the apparatus in a predetermined sequence. For instance, assuming that the cylinders 47 for the saw head are exhausting and the saw is cutting work held in the front vise, downward travel of the saw head assembly to a lower limit at which the saw band has just completed its cut sets the control system into operation to effect upward retraction of the saw head assembly by its cylinders 47, closure of the rear vise upon the stock at the rear limit of travel of the carriage, release of the jaws of the front vise from the stock, forward motion of the carriage to advance stock gripped by the rear vise into the sawing zone, reclosure of the jaws of the front vise, release of the jaws of the rear vise, retraction of the rear vise carriage, and, finally, descent of the saw head assembly to bring the saw into cutting engagement with stock thus advanced into the sawing zone.

With such automatic operation of the apparatus, long lengths of stock may be cut into smaller pieces of an equal length determined by the setting of the adjustable stop mechanism 131. If the stock is to be sawed into pieces having greater length than the maximum stroke of the carriage cylinder 127, indexing recycling instrumentalities of the type shown in Figure 7 are incorporated in the control system to effect repetition of the back and forth motion of the rear vise carriage two or more times in order to achieve one feeding operation. This, of course, involves setting of the adjustable stop mechanism 131 at a dimension on the scale 138 constituting a multiple of the desired length of the pieces to be cut.

Referring first to Figure 6, it will be seen that a pump 143 driven by an electric motor 144 is provided to supply fluid under pressure to the head cylinder 47, the vise cylinders 83, and the carriage cylinder 127. For purposes of clarity, the cylinders 105 for the top jaws of the vises have been omitted from the diagrams (Figures 6 and 7) since they are operated in the same way and at the same times as the cylinders 83 of their respective vises.

The inlet of the pump is connected with a fluid reservoir 145, and its outlet is connected with two solenoid operated control valves, 146 and 147, through ducts 148 and 149, respectively. The control valve 146 governs connection of the pump outlet with the vise and saw head cylinders 83 and 47, respectively, while the control valve 147 selectively governs connection of the pump outlet with the opposite ends of the double acting cylinder 127 by which the rear vise carriage is reciprocated.

The control valve 146 is biased by a spring 150 to a normal or deenergized position shown, from which its plunger 151 may be actuated to the left upon energization of the solenoid operator 152 of the valve. In its deenergized position, the control valve 146 directs fluid under pressure through a duct 153 to the cylinder 83 for the front vise, and the front vise is accordingly closed. It also directs pressure fluid into the chamber of a pressure switch 154 through a branch 153' of the duct 153 to hold the two sets of contacts C1 and C2 of the switch closed; and effects opening of the rear vise by providing for exhaust of fluid from its cylinder 83 to the reservoir 145 through a duct 155. A branch 155' of the duct 155 leads to the lower end of the saw head cylinder 47 so that pressure fluid will be supplied thereto and to the rear vise cylinder 83 when the coil 152 of valve 146 is energized to shift the plunger of the valve to the left from its position shown. In the energized position of the control valve 146, therefore, the rear vise is closed, and the front vise is open because its cylinder is connected to the reservoir through the valve; and the pressure switch 154 is accordingly open because of the absence of pressure in the duct 153.

A check valve 156 in the branch duct 155' which connects with the head cylinder 47 permits pressure fluid to be directed into the head cylinder but closes to prevent descent of the saw head when the plunger 151 of the control valve is in its deenergized position.

The exhaust of fluid from the head cylinder 47, and consequently the descent of the saw head in its cutting operation, is controlled by an electromagnetic exhaust valve 157 and a throttle valve 158, respectively connected in series in a duct 159 leading from the lower end of cylinder 47 to the reservoir.

The control valve 147 for the carriage cylinder 127 is shown in a neutral or hold position disconnecting each end of the cylinder from both the pump and the reservoir. Its control plunger 160 is shifted to the left of neutral upon energization of a first solenoid 161, and it may be shifted to the right of neutral upon energization of a second solenoid 162. When shifted to the left, the plunger connects the right hand end of the carriage cylinder 127 with the pressure source and communicates the left hand end of the cylinder with the reservoir, thus effecting retraction of the rear vise carriage. Likewise, when the plunger 160 is shifted to the right as a consequence of energization of coil 162, it connects the left hand end of the carriage cylinder with the pressure source and communicates the right hand end of the cylinder with the reservoir, thus effecting the feed stroke of the carriage.

The rear limit switch 140, as stated, may be a part of the adjustable stop mechanism 131. For convenience, it is shown provided with a pivoted contactor which is at all times in engagement with one or the other of a pair of contacts L and R. When the contactor is moved off of the R contact and onto the L contact, as by the engagement of a fore and aft adjustable stop 164 on the carriage with the contactor during retraction of the carriage, the rearward travel of the carriage is stopped. A fixed stop 165 on the carriage is engageable with the contactor of switch 140 to carry it off of the L contact and onto the R contact at the forward limit of travel of the carriage. Since the forward travel or feed motion of the carriage is always stopped at the same point, the limit switch 140 may, if desired, be mounted at a fixed location, not necessarily on the adjustable stop mechanism 131.

The adjustable stop mechanism includes a normally open switch 166 that is closed only by the stop 165 on the carriage when the latter reaches its rear limit of motion.

Upper and lower limit switches 168 and 169, respectively, are provided for the saw head, and are shown adapted to be actuated by an arm 170 on the piston rod of the head cylinder 47.

The control system also includes an electromagnetic switch 172 having a solenoid 173, three sets of normally open contacts A, B and C, and a set of normally closed contacts D.

The Figure 6 diagram shows the relative positions of the components of the apparatus and the condition of the elements of the control system at the instant the saw head has completed a downward cutting stroke. Consequently, the arm 170 of the saw head cylinder has reached a lowermost position at which it has just swung the contactor of lower limit switch 169 off of its F contact toward which it is biased, and onto its E contact. At this time, solenoid operated exhaust valve 157 has just been deenergized (closed) by the opening of the F contact of the lower limit switch to stop the exhaust of fluid from the lower end of the head cylinder 47; electromagnetic switch 172 is in the deenergized position shown; electromagnetic control valve 146 is in the deenergized position shown so that the front vise and the pressure switch 154 are closed; the rear vise is open due to the fact that its cylinder 83 is connected to the reservoir through the valve 146; the control valve 147 is in the neutral position shown; and the rear vise carriage 75 is at its rear limit of travel.

Actuation of the lower limit switch 169 upon such completion of the cutting stroke of the saw, effects energization of the coil 173 of the electromagnetic switch 172, thereby opening its D contacts and closing its A, B and C contacts. This energizing circuit includes a conductor 175 connecting electric power line L1 with the contactor of the lower limit switch 169, a second conductor 176 connecting the now bridged E contact of switch 169 with the contactor of limit switch 166 on the carriage stop mechanism 131, and a conductor 177 connecting the bridged contact of switch 166 with one end of the coil 173 for the electromagnetic switch 172. The other end of the coil 173 is connected with the other electric power line L2.

Closure of the C contacts of switch 172 in the manner described establishes a holding circuit for its coil 173. This holding circuit includes a conductor 179 which connects electric power line L1 with the contactor of limit switch 140, and a conductor 180 leading from the bridged L contact of the switch through the now closed C contacts of switch 172 to the L1 side of the coil 173 of the switch.

Closure of the A and B contacts of switch 172 establishes an energizing circuit for the coil 152 of the control valve 146. This circuit includes a conductor 182 joined to electric power line L1, the closed A contacts of switch 172, a conductor 183 joined to conductor 182, the closed B contacts of switch 172, and a conductor 184 leading to one end of the coil 152 of control valve 146. The other end of coil 152 is connected directly to power line L2.

Energization of the coil 152 of control valve 146 causes its control plunger 151 to be shifted to the left from its position shown, to pressurize the rear vise cylinder 83, thus closing the rear vise, and to direct pressure fluid into the lower end of the saw head cylinder 47. The saw head thus starts to raise, and the lower limit switch 169 immediately returns to its normal position at which its contactor drops away from the E contact and bridges the F contact thereof. Such shifting of the control plunger 151 of valve 146 also connects the front vise cylinder and the pressure chamber of switch 154 with the reservoir, to result in opening of the front vise concomitantly with dropping out of the pressure switch and opening of its contacts C1 and C2.

When the piston of the saw head cylinder reaches the end of its stroke, arm 170 on the piston rod closes the upper limit switch 168 to effect energization of the right hand coil 162 of carriage control valve 147 and thus start forward work feeding motion of the carriage. This energizing circuit leads from power line L1, through conductor 182 and the closed A contacts of switch 172, the now closed upper limit switch 168, and a conductor 186 connecting with the L1 side of the coil 162 of valve 147. The other end of coil 162, of course, is connected to power line L2. It should be noted, however, that the switch 93 is connected in series in the energizing circuit for coil 162 so that it will be opened upon excessive closing motion of the rear vise jaws, as would be the case if no stock was between them. In that event, coil 162 could not be energized, and the rear vise carriage would not be moved forwardly; and in fact the whole control system would then cease to function.

Energization of coil 162 shifts the plunger 160 of the control valve to the right, out of neutral, to cause pressure fluid to be directed into the left hand end of the carriage cylinder 127, and the carriage is thus moved forwardly thereby. Switch 166 on the adjustable stop mechanism 131 is opened as soon as the carriage begins its work feeding motion. The front vise, of course, is open at this time, and the saw head remains in its uppermost position.

The feed stroke of the rear vise carriage is terminated when the fixed stop 165 on the carriage engages the contactor of limit switch 140 and swings the contactor off of the L contact and onto the R contact of the switch. Such actuation of limit switch 140 immediately breaks the holding circuit for coil 173 of switch 172, so that the A, B, and C contacts of switch 172 open and the D contacts thereof close. The opening of the A and B contacts of switch 172 consequently simultaneously breaks the energizing circuit for the coil 152 of control valve 146, and for the coil 162 of control valve 147, to stop the carriage by return of the plunger of control valve 147 to its neutral position shown, and to reverse the pressure conditions of the front and rear vises. Accordingly, the rear vise opens and the front vise closes. The pressure switch 154, of course, is pressurized whenever the front vise closes, and its contacts C1 and C2 are closed concomitantly with closure of the front vise.

The closure of the C1 contacts of the pressure switch then completes an energizing circuit for the electromagnetic exhaust valve 157 through the now closed D contacts of switch 172, the F contact of the lower limit switch 169, and the contactor of the switch 169 then engaged, with the F contact. This energizing circuit includes conductor 175 leading from electric power line L1 through the contactor of lower limit switch 169, conductor 188 connecting with the now bridged F contact of switch 169, the closed D contacts of switch 172, and conductor 189 leading to one end of the coil of exhaust valve 157 through the now closed contacts C1 of the pressure switch 154. Valve 157 thus opens to allow fluid from the head cylinder 47 to exhaust to the reservoir at a rate depending upon the setting of the throttle valve 158. Accordingly, the saw head begins to descend and cutting of the stock held in the front vise begins.

While sawing takes place, retracting motion is imparted to the rear vise carriage 75. Such retraction of the carriage is initiated indirectly by opening of the L contact of limit switch 140 at the end of the carriage feed stroke, which as noted above, resulted in closure of the pressure switch contacts C1 and C2, and directly by the bridging of the R contact of limit switch 140 at the end of the carriage feed stroke. Bridging of the R contact of limit switch 140 establishes an energizing circuit for coil 161 of control valve 147, causing the plunger of the valve to be shifted to the left out of its neutral position, to direct pressure fluid into the right hand end of the carriage cylinder 127. This energizing circuit includes the conductor 179 leading from power line L1 to the contactor of limit switch 140, and a conductor 190 connecting with the now bridged R contact of the switch and leading to one end of the coil 161 through the now closed C2 contacts of the pressure switch 154. The other end of coil 161 is connected directly to power line L2.

If the cutting operation should be completed before the rear vise carriage reaches its rear limit of travel, the control cycle cannot be recommenced merely as a consequence of actuation of the lower limit switch 169, by arm 170, to its position shown in the diagram. The control cycle can be repeated after completion of the cutting operation only when the limit switches 166 and 140 have been returned to their positions shown. This feature of requiring the rear vise to be always returned to its predetermined rearward limit by the carriage cylinder 127, thus assures feeding of the desired length of stock to the front vise with each control cycle.

Regardless of whether or not the sawing operation has been completed first, the retraction of the rear vise carriage is halted at the desired location at the time the adjustable stop 164 on the carriage engages the contactor of limit switch 140 and swings it off of the R contact and onto the L contact of the switch. This, of course, breaks the energizing circuit for the coil 161 of control valve 147, and the plunger of the valve consequently returns to its neutral position shown. Concomitantly with such actuation of limit switch 140, the fixed stop 165 on the carriage recloses the limit switch 166, to thus enable the cycle to be restarted provided the saw head has completed its cut and limit switch 169 has been actuated to its position shown in the diagram. If the saw head has not yet completed its cut, the rear vise carriage remains in its rearmost position and the cycle is not restarted until the lower limit switch is actuated by the arm 170 on the piston rod of the head cylinder to again effect deenergization of the electromagnetic exhaust valve 157 and reenergization of the coil of electromagnetic switch 172.

The control system illustrated in Figure 7 is in most respects similar to that described above. Its main distinctions are that its electromagnetic and pressure switches 172' and 154', respectively, are each provided with an additional set of contacts. The switch 172' thus has four sets of normally open contacts A, B, C and G, and one set of normally closed contacts D. The pressure switch has two sets of normally open contacts C1 and C2, and one set of normally closed contacts C3. In addition, the limit switch 140' has only one contact C7, and the pivoted contactor of the switch is carried into bridging engagement with it by the adjustable stop 164 as the carriage reaches its predetermined rearward limit of travel. The switch 140' is connected in series with the A and B contacts of the electromagnetic switch 172', and thus controls energization of the coil 152 of the control valve 146.

The control system of Figure 7 is also provided with automatically operable carriage recycling means for effecting repetition of the fore and aft motion of the carriage two or more times in order to achieve feeding of stock in lengths greater than the maximum possible stroke of the piston rod of the carriage transport cylinder 127 with each cycle of operation of the systems. This recycling means includes an overcenter snap switch 192 having a pivoted contactor 193, and a hydraulic jack 194 the plunger 195 of which is positioned to effect tripping of the contactor of the overcenter switch out of its normal position shown upon extension of the jack plunger a distance depending upon the length of stock to be fed.

The overcenter snap switch 192 has an upper contact C4, a middle contact C5, and a bottom contact C6. The upper contact C4 is normally engaged by the contactor 193 of the switch to perform the same function as the L contact of limit switch 140 of the Figure 6 control system, when said L contact is engaged by the contactor of the switch. In other words, since the contactor of snap switch 192 is connected to electric power line L1, and since the upper contact C4 of the switch is connected with the coil 173 of switch 172' through the C contacts of the switch 172', the bridged C4 contact of the snap switch is likewise capable of establishing a holding circuit for the coil of switch 172'.

The other two contacts C5 and C6 of the overcenter snap switch are bridged by the contactor 193 of the switch when it is tripped by the plunger of hydraulic cylinder 194. Bridging of the contact C5 is relied upon during recycling of the carriage 75 to establish an energizing circuit for the coil 161 of control valve 147, but there is a second energizing circuit for coil 161 which includes the extra set of contacts G on the switch 172', and one of the sets of contacts on the pressure switch 154'.

Bridging of the contact C6 of the snap switch 192 completes an energizing circuit for the coil 197 of an electromagnetic resetting device 198 for the hydraulic jack 194. When coil 197 is energized, it actuates the release lever 199 of the jack, permitting the plunger 195 of the jack to be retracted under the influence of suitable bias acting thereon.

The jack 194 is actuated as a consequence of counterclockwise swinging motion of a medially pivoted operating lever 200. Such motion is imparted to the lever 200 through the medium of a link 201 connected at one end to the free end of the operating lever, and extending forwardly therefrom through a hole in the depending bracket 129 on the carriage. This link has its forward end portion threaded to adjustably receive a stop nut 202, so located on the link as to be engaged by the bracket 129 each time the carriage nears its forward limit of travel. In this way, the link is moved to the right (forwardly) by the carriage a distance determined by the adjustment of the stop nut 202 on the link, and the operating lever is correspondingly swung in its counterclockwise pumping stroke through an arc depending upon the extent of forward endwise motion of the link. Consequently, each time the carriage reaches its forward limit of travel, the plunger 195 of the jack will be extended a distance determined by the setting of the stop nut 202, until the plunger trips the overcenter snap switch 192 and thus effects breaking of the holding circuit for the coil 173 of electromagnetic switch 172'.

From the above, it will be apparent that unlike the Figure 6 control system, the carriage recycling means of the Figure 7 system functions to hold the electromagnetic switch 172' against deenergization on the first advance of the carriage or until the carriage has been reciprocated a predeterminable number of times corresponding to a multiple of the length of stock to be sawed. For example, if the maximum stroke of the piston rod of the carriage transport cylinder 127 is 24 inches, and it is desired to cut long lengths of stock into pieces thirty-six inches long, limit switch 166 may be adjusted to be engaged and closed by the carriage stop 165 upon rearward travel of the carriage a distance equal to one-half of thirty-six inches, or eighteen inches from its forward limit of travel. Stop 164 is also adjusted to effect closure of limit switch 140' concomitantly with closure of limit switch 166. The stop nut 202 may then be adjusted to effect tripping of the contactor of the overcenter switch 192 by the plunger 195 of jack 194 the second time the carriage reaches its forward limit of travel.

By way of further example, if it is desired to cut long lengths of stock into pieces 51 inches long, a dimension greater than twice the maximum possible stroke of the carriage cylinder, the recycling means is adjusted to effect three feed strokes of the carriage, each equal to 17 inches in length, before the switch 192 is tripped by the jack plunger 195. It will be understood, of course, that corresponding adjustments will have to be made for the limit switch 166 and especially for the adjustable stop 164 by which closure of the limit switch 140' is effected each time the carriage reaches a position 17 inches rearwardly of its foremost position.

Figure 7 shows the condition of the control system which obtains at the instant the piston rod of the saw head cylinder is fully extended and the saw head has been carried to its upper limit of motion following completion of a cut. The arm 170 has just closed the upper limit switch 168, and forward motion can now be imparted to the carriage 75 to effect feeding of stock to be cut by the saw, for example into 51-inch lengths. Up until this point, the operation of the control system of Figure 7 was the same as that described in connection with the Figure 6 system.

Such closure of the upper limit switch 168 effects energization of the coil 162 of control valve 147. This energizing circuit leads from power line L1, along conductor 182, and serially through the closed A contacts of switch 172' and the switch 168 onto conductor 186 which leads to coil 162 through the normally closed C3 contacts of the pressure switch 154' and the rear vise switch 93. The shifting of the plunger of control valve 147 which results from such energization of its coil 162 causes pressure fluid to be directed into the left hand end of the carriage transport cylinder 127, and the carriage starts forwardly to advance stock held in the closed rear vise with it.

When the carriage reaches its forward limit of travel, stop 165 thereon opens limit switch 140' and the engagement of bracket 129 on the carriage with the stop nut 202 imparts a pumping impulse to the jack 194 to cause its plunger 195 to be extended ⅓ the distance necessary to cause tripping of the overcenter switch 192 thereby. This position of the plunger is indicated by the dotted lines closest to the outer end of the jack plunger.

The opening of limit switch 140', of course, breaks the energizing circuit for coil 152 of control valve 146, thus causing the valve plunger to be returned to its normal position at which it effects closing of the front vise upon the work thus advanced, and opening of the rear vise. The pressure switch 154' is also pressurized at this time by the control valve 146, and its C1 and C2 contacts close, while its C3 contacts open. Opening of the C3 contacts of the pressure switch breaks the energizing circuit for the coil 162 of control valve 147, but closure of pressure switch contacts C1 establishes an energizing circuit for the coil 161 of the control valve, thereby causing the plunger of the valve to be shifted past neutral to its left hand position at which it directs pressure fluid into the right hand end of the carriage transport cylinder and accordingly starts the carriage moving rearwardly, with the jaws of the vise thereon open.

The saw head, however, stays at its upper limit of travel due to the fact that the D contacts of the still energized electromagnetic switch 172' are open to prevent energization of the saw head cylinder exhaust valve 157.

When the rear vise carriage reaches its rearmost position, in this case 17 inches back from its foremost position, its stop 165 recloses limit switch 166, while its adjustable stop 164 recloses limit switch 140'. The closure of limit switch 166 has no effect upon the control system at this time, but reclosure of limit switch 140' effects reenergization of coil 152 of control valve 146, causing its plunger to be actuated to the left to the position shown in the diagram. Such actuation of the control valve 146 effects closure of the rear vise, opening of the front vise, and deactivation of the pressure switch 154', causing reclosure of its C3 contacts and opening of its C1 and C2 contacts. Opening of the C1 contacts breaks the energizing circuit for coil 161 of control valve 147, and closure of the C3 contacts effects reenergization of the coil 162 of the valve, thus causing the rear vise carriage to be moved forwardly in its second feed stroke. This second feed stroke of the carriage causes another pumping impulse to be manifested in the hydraulic jack 194 when the bracket 129 on the carriage strikes the adjustable stop nut 202 on the jack link 201, and the plunger of the jack is advanced to its second position (indicated in broken lines in the diagram) quite close to the contactor of the overcenter snap switch 192.

The second feed stroke of the carriage is again terminated when the limit switch 140' is opened by the stop 165 on the carriage, and the response of control valve 146 to the resulting deenergization of its coil 152 again effects closure of the front vise, opening of the rear vise, and actuation of the pressure switch to reclose its C1 and C2 contacts and reopen its C3 contacts. The C1 and C3 contacts thus again effect reversal of the position of the control plunger of control valve 147, and the rear vise carriage is again returned to its rearmost position defined by reclosure of limit switch 140' by the stop 164 on the carriage. The saw head, of course, is still held in its raised position at which the upper limit switch 168 is closed.

From the description thus far, it will be apparent that limit switch 140', which is alternately opened and closed by the stops 165 and 164 on the carriage, respectively, during travel of the carriage to its fore and aft limits, acts as the means for effecting reversal of the carriage each time it reaches one or the other of its limits of travel, and for also effecting alternate opening and closing of the vises in timed relation to reciprocation of the carriage between its limits of travel. In this respect, it will be appreciated that the hydraulic control valve 146 which is governed by the switch 140' controls the pressurization of the vise cylinders 83 and the operation of pressure switch 154', while the pressure switch in turn controls energization of the coils 161 and 162 of the hydraulic control valve 147 for the carriage transport cylinder 127.

Consequently, the reclosure of limit switch 140' by the carriage at the conclusion of its second return stroke effects reversal of the carriage and forward travel thereof to advance the stock held in the rear vise the third and final 17-inch increment. However, when the carriage then reaches its forward limit of travel defined by opening of limit switch 140', it also actuates the hydraulic jack 194 to cause extension of its plunger 195 the short distance necessary to trip the overcenter snap switch 192. When that happens, the contactor 193 of the overcenter switch is snapped away from engagement with contact C4 and into engagement with the contacts C5 and C6. The disengagement of the contactor from the C4 contact of the overcenter switch immediately breaks the holding circuit for coil 173 of the electromagnetic switch 172', and the switch drops out to close the D contacts thereof, and open its A, B, C and G contacts.

Opening of limit switch 140' again effects deenergization of the coil 152 of control valve 146 to cause closure of the front vise, opening of the rear vise, and pressure actuation of the pressure switch 154' to effect reclosure of its C1 and C2 contacts and opening of its C3 contacts. However, the coil 161 of control valve 147 is not reenergized by closure of the C1 contacts concomitantly with deenergization of coil 162 by opening of the C3 contacts, as was the case during recycling of the rear vise carriage. This results from the fact that the C1 contacts are in series with the G contacts of switch 172', and these G contacts have now been opened by the aforesaid deenergization of the coil of switch 172' that was effected by separation of the contactor of the overcenter switch from the C4 contact thereof.

At this time, coil 161 of control valve 147 is energized through the now bridged contact C5 of the overcenter snap switch 192, and the rear vise carriage is moved rearwardly as a result thereof. This alternate energizing circuit for coil 161 leads from electric power line L1 to the contactor of switch 192 through a conductor 204, and includes a conductor 205 connecting with the now bridged C5 contact of the switch and with a conductor 206 that leads to the L1 side of the coil 161. As will be apparent, the conductor 206 also leads to conductor 175 and to power line L1 through the G contacts of electromagnetic switch 172' and the C1 contacts of the pressure switch 154' when these contacts are closed.

The tripping of overcenter switch 192 also establishes an energizing circuit for the jack resetting coil 197. This circuit leads from power line L1, through conductor 204 and contactor 193 of the switch to the now bridged C6 contact of the switch, and continues through a conductor 207 connecting the C6 contact with the L1 side of the resetting coil 197. The other side of coil 197 is connected to power line L2. Energization of the coil 197 in this manner actuates the relief lever 199 of the jack and permits the jack plunger 195 to be fully retracted under suitable bias.

It will be recalled that the overcenter switch 192 was tripped at the end of recycling of the rear vise carriage, substantially at the same time that limit switch 140' was opened by the carriage. Electromagnetic switch 172' was thus deenergized by switch 192, and the coil 152 of control valve 146 was also deenergized to effect closure of the front vise, release of the rear vise, and actuation of the pressure switch 154'. In this condition of switches 172' and 154', an energizing circuit is established for the coil of the head cylinder exhaust valve 157 by the closure of the D contacts of switch 172' and the closure of the C2 contacts of the pressure switch. This energizing circuit leads from power line L1 through conductor 175 to the contactor of the lower limit switch 169, contact F of the switch now bridged by the contactor, through conductor 188 and the closed D contacts of switch 172', and conductor 189 leading through the now closed C2 contacts of the pressure switch to the L1 side of the coil of exhaust valve 157. The other side of the coil is connected to power line L2.

As soon as the exhaust valve 157 is opened by such energization of its coil, the saw head cylinder starts to exhaust to the reservoir through the valve, and the saw head descends to begin its cutting operation. The upper limit switch is caused to open by such descending motion of the saw head, and cutting takes place at a rate depending upon the setting of the throttle valve 158 in the exhaust line 159.

The rear vise carriage may or may not reach its rearmost position before the cutting operation is completed. If it does, it recloses limit switches 166 and 140', but closure of the latter is not then relied upon to stop the rearward travel of the carriage due to the fact that it can only perform that function when electromagnetic switch 172' is energized and its A and B contacts are closed. Rearward travel of the carriage is now stopped at the desired limit by return of the contactor 193 of the overcenter snap switch 192 to its original position shown in the diagram. This is accomplished by an arm 208 on the adjustable carriage stop 164. This arm engages the upper end of the contactor 193 substantially at the time the carriage reaches its rearmost position, and flips the contactor to its position bridging contact C4 and disengaged from contacts C5 and C6 of the overcenter switch. Such actuation of the overcenter switch effects deenergization of coil 161 of the carriage control valve 147, along with deenergization of the resetting coil 197 of the hydraulic jack 194. The control valve plunger 160 thus returns to its neutral position shown, and the carriage stops at the desired rearward limit of travel thereof.

Regardless of whether the sawing operation has or has not been completed before the carriage is thus returned to its rearmost position, the switches 166, 140' and 192 controlled by the carriage must be in their position shown before a new feed and cutting cycle can be started. In other words, if the lower limit switch 169 is actuated by the arm 170 on the piston rod of head cylinder 47 to effect bridging of the E contact of the switch before the carriage has returned to its rear position closing switches 166, 140' and returning overcenter switch to its position shown, the saw head merely remains down until the three designated carriage controlled switches are actuated to their positions shown in solid lines in the diagram. If the carriage is returned to its rearmost position first, it merely remains there until the E contact of the lower limit switch is bridged by the contactor of the switch as the saw head reaches its lowermost position. Thereafter, in either event, the bridged E contact of switch 169 and the closed limit switch 166 connected in series therewith establish an energizing circuit for the coil 173 of electromagnetic switch 172', and a new control cycle is restarted in the manner described hereinbefore. This new cycle will again include recycling of the rear vise carriage the three times necessary to effect feeding of a 51-inch length of stock to the saw, while the saw head is held in its fully raised position, and the system will function to release the saw head for descent in its cutting stroke only after tripping of the overcenter switch 192 as a consequence of the third advance of the carriage to its forward limit of travel.

From the foregoing description taken together with the accompanying drawings, it will be readily appreciated by those skilled in the art that the band saw of this invention features an improved arrangement of its components as well as novel work holding and advancing means; together with novel control means for automatically governing operation of the apparatus.

What is claimed as my invention is:

1. In a cutoff saw, the combination of: releasable means to grip and hold work in a sawing zone; a saw head constrained to up and down motion over the sawing zone, said saw head including a power driven sawing element having a downwardly facing cutting edge to cut through work held in said zone as the saw head descends; a first power operated means connected with the saw head to effect up and down motion thereof; means for feeding work into position to be sawed in the sawing zone, comprising a vise mounted for bodily horizontal motion toward and from the sawing zone; a second power operated means for imparting fore and aft reciprocation to the vise; a third power operated means for effecting opening and closing of said vise; control means for said three power operated means including instrumentalities rendered operative by the saw head upon movement thereof to a predetermined elevated position raised above the sawing zone for repeatedly effecting fore and aft reciprocation of the vise between defined limits, and for effecting opening and closing of the vise as a consequence of the vise reaching its fore and aft limits of motion, respectively; and means responsive to return of the vise to its forward limit of motion a predetermined number of times in succession, to stop further fore and aft reciprocation of the vise and to render the power operated means for the saw head operative to effect descent of the saw head and engagement of its sawing element with work fed into the sawing zone.

2. In a cutoff tool, the combination of: a movable tool head carrying a cutting tool; means mounting the tool head and constraining it to motion which advances the cutting tool toward and retracts it from a cutting zone; first power operated means connected with the tool head to effect such motion thereof; means for feeding work into position to be cut in said zone, comprising a vise mounted for bodily reciprocation toward and from the cutting zone, a second power operated means connected with said vise to reciprocate the same, a third power operated means operatively connected with the vise to effect opening and closing thereof; releasable means to grip work fed to the cutting zone and hold the same while it is being cut control means for said three power operated means including instrumentalities rendered operative by the tool head upon retraction thereof from the cutting zone for repeatedly effecting fore and aft reciprocation of the vise between defined limits, and for effecting opening and closing of the vise as a consequence of the vise reaching its fore and aft limits of reciprocation, respectively; and adjustable means adapted to be actuated as a consequence of motion of the vise on a forward stroke other than its initial work advancing stroke, to stop further fore and aft reciprocation of the vise and to activate said first power means to effect advance of the tool head and consequent cutting of the work whereby said vise may repeatedly grip and advance a piece of work a predetermined distance greater than a single full stroke of the vise before the fore and aft reciprocation of the vise is stopped and the tool head is activated to effect the cutting action.

3. In a metal cutting machine tool having a power driven cutting tool operating in a defined zone, means to securely but releasably hold work to be cut in the cutting zone and to feed work into said zone comprising: a work supporting table upon which the work to be cut rests; a front vise mounted at a fixed location adjacent to said table and to the cutting zone to grip and hold work while it is being cut, and a rear vise mounted for bodily reciprocation toward and from the front vise and operable to advance work across the table into the bite of the front vise, each of said vises having opposing upright clamping jaws movable across the work supporting table toward and from one another along paths normal to the path of bodily movement of the rear vise, each of said vises also having a top jaw movable vertically toward and from the table and spanning the distance between the upright jaws to press work which is received between the upright jaws down onto the table; means connecting the top jaw of each vise with its respective upright jaws in a manner to maintain cooperative relationship between said jaws while permitting lateral motion of the upright jaws toward and from one another as well as vertical motion of the top jaw relative to the upright jaws; fluid pressure responsive means to close the upright jaws of each vise onto work therebetween; fluid pressure responsive means to force the top jaw of each vise down; means to simultaneously energize both of said fluid pressure responsive means of either vise; and power means connected with the rear vise to impart controlled reciprocation thereto.

4. In a metal cutting machine tool, the combination set forth in claim 3, but wherein the means connecting each top jaw with its upright jaws accommodates motion of each upright jaw toward or from its mate and with respect to the top jaw so that the fluid pressure responsive means acting on the top jaw at all times may be centered between the upright jaws.

5. In a machine of the character described: a work holding vise adapted to grip and securely hold a bundle of rods or the like, said vise comprising a pair of upright jaws movable toward and from one another and adapted to apply a lateral clamping pressure upon work placed therebetween; a top jaw spanning the distance between the upright jaws and movable vertically to apply a downward clamping pressure upon work between the upright jaws; means connecting the top jaw with each of the upright jaws to hold the top jaw in cooperative relation with the upright jaws, said means comprising slidably engaging surfaces on the top jaw and the upright jaws which accommodate relative motion between the top jaw and the upright jaws necessitated by the application of either lateral or downward clamping pressure upon work in the vise; fluid pressure responsive means acting upon at least one of said upright jaws to effect lateral clamping of the work; fluid pressure responsive means acting upon the top jaw to effect downward clamping pressure upon the work; and means to simultaneously energize said two fluid pressure responsive means.

6. In a machine tool, the combination set forth in claim 5 further characterized by the provision of: means mounting the fluid pressure responsive means for the top jaw on the upright jaws; and by the fact that said mounting accommodates relative motion of the upright jaws toward and from one another so that said fluid pressure responsive means may be centered between the upright jaws regardless of the distance therebetween.

References Cited in the file of this patent
UNITED STATES PATENTS

| | | |
|---|---|---|
| 1,205,125 | Dies | Nov. 14, 1916 |
| 1,840,684 | Welch | Jan. 12, 1932 |
| 2,491,901 | Moohl et al. | Dec. 20, 1949 |
| 2,594,548 | Flick | Apr. 29, 1952 |
| 2,602,987 | Wells | July 15, 1952 |
| 2,669,261 | Bowers et al. | Feb. 16, 1954 |
| 2,691,206 | Kautz | Oct. 12, 1954 |
| 2,769,224 | Hake | Nov. 6, 1956 |